April 18, 1967   F. S. FLICK ETAL   3,314,443
VALVING STRUCTURE

Original Filed Nov. 8, 1963   6 Sheets-Sheet 1

Inventors:
Francis S. Flick
Richard M. Morgan

By Hofgren, Wegner, Allen,
Stellman & McCord
Attorneys

April 18, 1967 F. S. FLICK ETAL 3,314,443
VALVING STRUCTURE
Original Filed Nov. 8, 1963 6 Sheets-Sheet 2
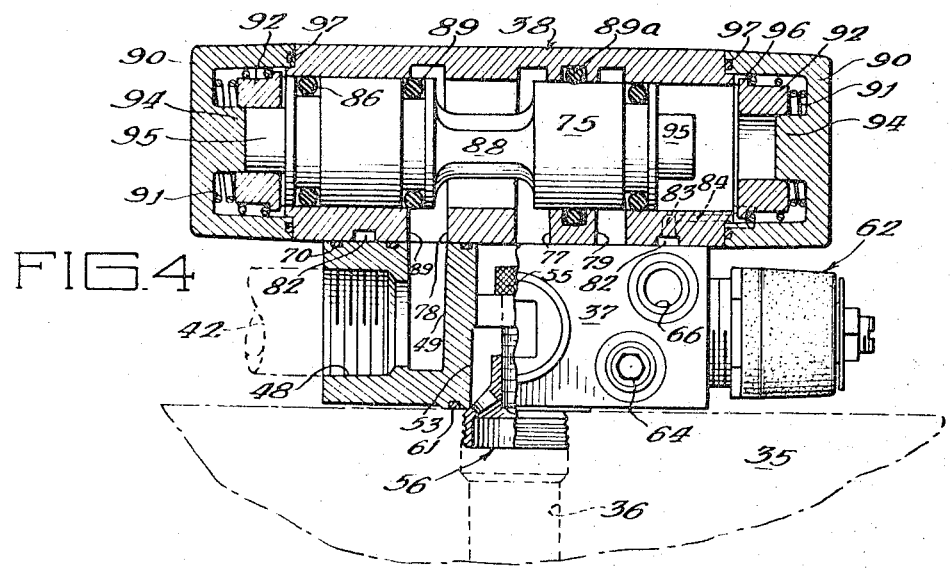
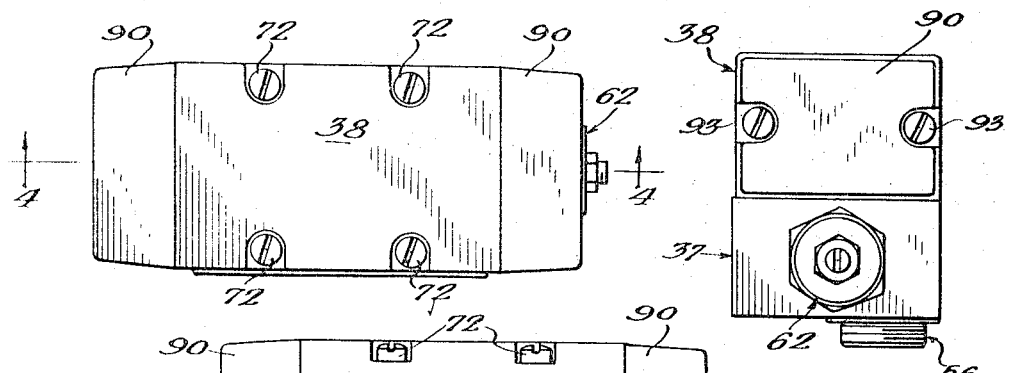
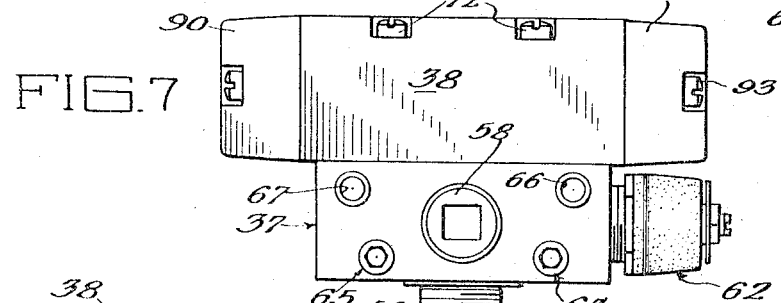
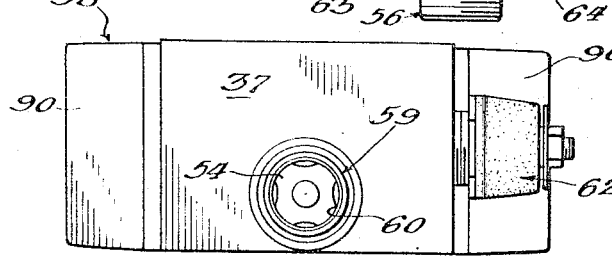

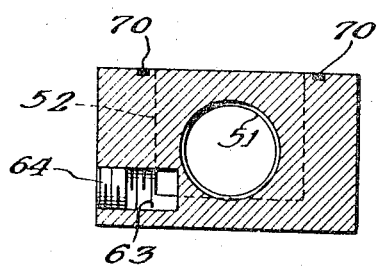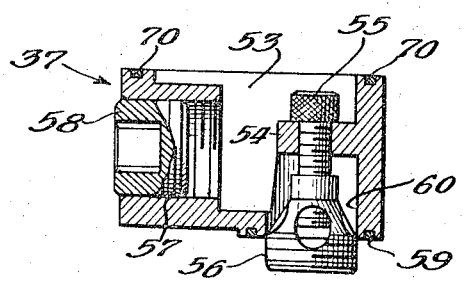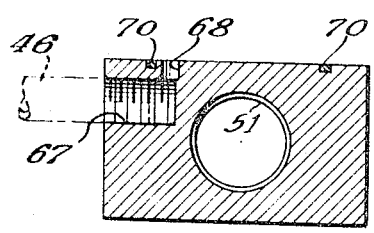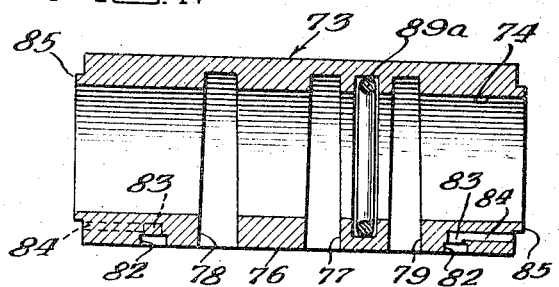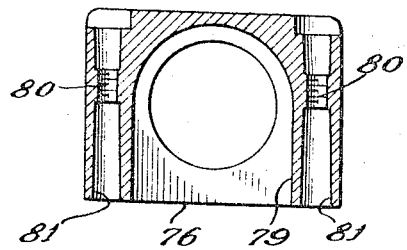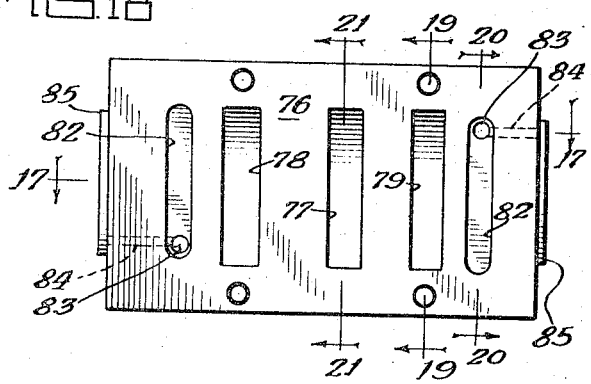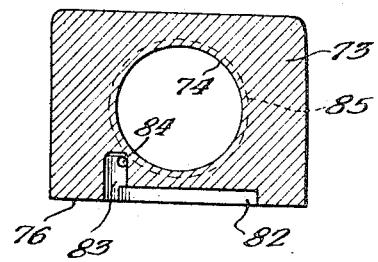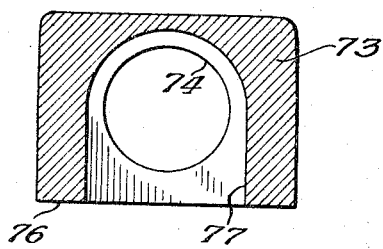

April 18, 1967   F. S. FLICK ET AL   3,314,443
VALVING STRUCTURE
Original Filed Nov. 8, 1963   6 Sheets-Sheet 5
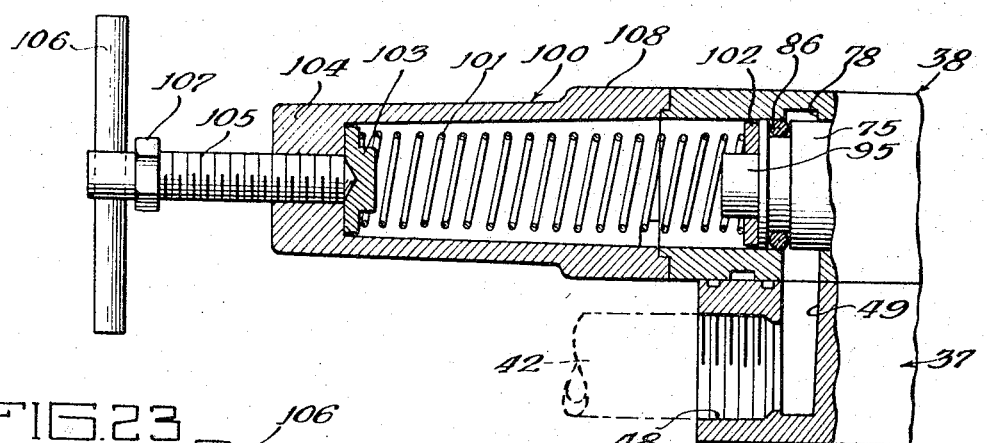
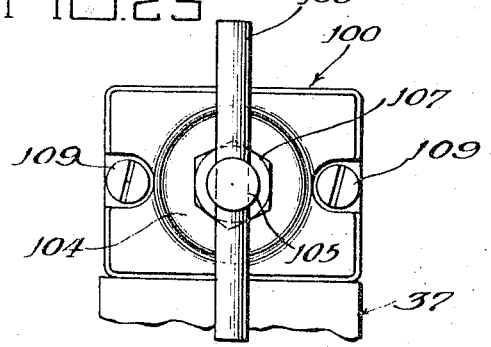
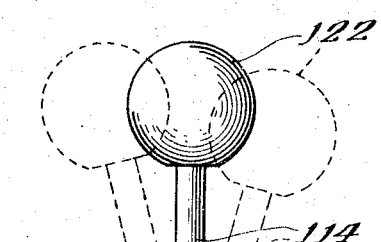
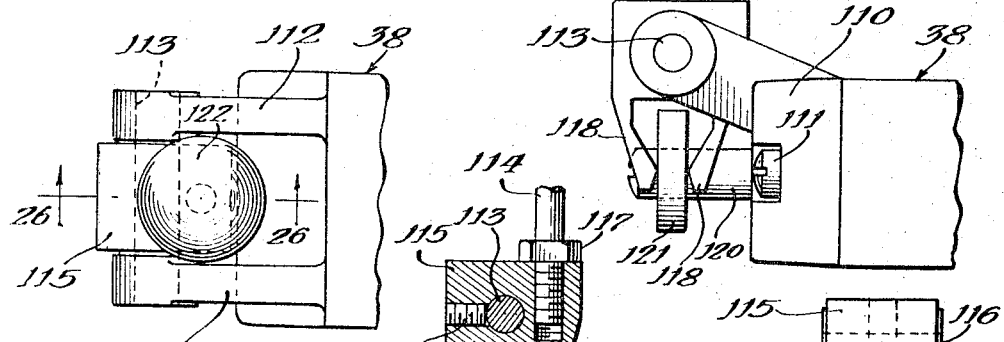
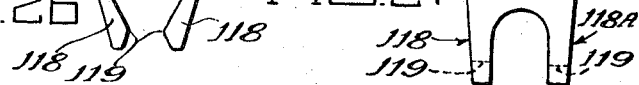

United States Patent Office 3,314,443
Patented Apr. 18, 1967

3,314,443
VALVING STRUCTURE
Francis S. Flick, Oak Park, and Richard M. Morgan, River Forest, Ill., assignors to Flick-Reedy Corporation, a corporation of Illinois
Original application Nov. 8, 1963, Ser. No. 322,355, now Patent No. 3,272,221. Divided and this application June 17, 1965, Ser. No. 472,751
8 Claims. (Cl. 137—270)

This invention relates to a valving structure and more particularly to an air valve unit including a subplate and a spool-type valve mountable directly upon the port of a motor for controlling the flow of the motive fluid to and from such a motor.

This is a divisional application of our co-pending application Ser. No. 322,355, filed Nov. 8, 1963, now Patent No. 3,272,221.

In the pneumatic and hydraulic piston and cylinder control art, a large variety of different valves has been used to control the flow of fluid used to move the piston within the cylinder. These valves have had various definitions, including two-way, three-way, four-way, etc., these terms being definitive of the number of ports that the spool of the valve may serve to effect various connections between fluid passages or lines.

The present valve structure is particularly concerned with air valves but also operates with liquid fluids. The valve can perform all the operations of two-position valves, including a normally open, a normally closed, and a position determined by the position in which the valve was last set, more briefly referred to as a momentary impulse, and in addition thereto, the operation of a three-position valve in which a connection may be made between the air supply and the cylinder, the cylinder and the exhaust, or returned to a spring-centered position in which all ports of the valve are blocked.

The primary object of this invention is to provide a new modular concept of valve construction and assembly for the control of air flow to an air motor.

The present air control valve may be actuated by air pressure taken from the supply, this operation sometimes being called a pilot-actuated valve. The fluid causing the actuation may be either air or a liquid. It is also a feature of the present new valve structure that a simple substitution of mechanism for a bonnet on the valve will permit operation of the valve by hand, foot, or other mechanical means, all of which may be termed non-air actuated valves.

It is a further feature of the new structure that a simple substitution of an adjustable spring member on one end of the valve will provide a unit holding the valve in a position until the pressure of an opposing force is built up to a predetermined value, whereby the valve may operate as a sequence controlling valve. It is therefore an object of this invention to provide simple means for converting the valve from pilot pressure to hand or mechanical operation by substitution of a bonnet on the valve body.

In the present invention the valve is mounted substantially directly on the port conducting the air into the piston and cylinder device. An object of this invention is to provide a unit including a subplate and a valve assembly which can easily be assembled directly to cylinder ports providing quick supply and exhaust of air to the cylinder.

Another object is to provide such a subplate and valve with symmetry permitting the valve to be mounted in either of two positions relative to each other and having a subplate also reversible in position providing maximum latitude and convenience in piping an installation.

A subsidiary object of the invention is to provide connections for supply, exhaust and power communication properly oriented to the valve and the air motor while maintaining properly oriented pilot air connections for the controlling of the valve.

Another feature of the present valving unit is that the valve is mounted to the subplate distinctly apart from the piping of the air to the valve. Air lines are connected into the subplate and the valve mounted solely to the subplate so that the valve may be removed without disturbing the piping. Even more importantly, the subplate has means for connection to an air motor directly to the port for the air, so constructed and arranged that the motor may be disconnected from the valving unit without disturbing the air supply piping. It is thus an object of this invention to provide a structure in which the valve is removable without disturbing piping and in which the air motor may be removed from the installation also without disturbing the piping.

Another object is to provide novel means for sealing the modular components together automatically as a part of assembly.

A further object is to provide an assembly of modular units in which the subplate is the only unit connected to the air motor and in which the power valve may be mounted on the subplate and a control unit may also be mounted to the subplate for controlling the power valve, including a solenoid housing for operating the control valve, said power valve, solenoid and control valve each being removable from the assembly without disturbing any of the other modules.

Other features, objects and advantages of the present invention will be apparent from the following description of a preferred embodiment thereof illustrated in the accompanying drawings, in which:

FIGURE 4 is a central cross sectional view through the valve unit including the valve and the subplate showing in phantom the air connection piping and cylinder head upon which the unit is mounted, the subplate being in half section;

FIGURE 5 is a top plan view of the valving unit;

FIGURE 6 is an end elevational view of the valving unit;

FIGURE 7 is a side elevational view of the valving unit;

FIGURE 8 is a bottom plan view of the valving unit with the pipe port connecting device removed;

FIGURE 14 is a cross sectional view through the auxiliary air supply tap in the subplate taken substantially along line 14—14 in FIGURE 3;

FIGURE 15 is a cross sectional view through the central air passage in the subplate taken substantially along line 15—15 in FIGURE 3;

FIGURE 16 is a cross sectional view through the pilot air passage in the subplate taken substantially along line 16—16 in FIGURE 3;

FIGURE 17 is a central sectional view through the valve body of the valve structure shown in FIGURES 4 to 12 with all other parts of the valve removed;

FIGURE 18 is a bottom plan view of the valve body shown in FIGURE 17;

FIGURE 19 is a cross sectional view through the valve body through the exhaust port thereof substantially along line 19—19 in FIGURE 18;

FIGURE 20 is a cross section through the valve body showing the pilot pressure passages taken substantially along line 20—20 in FIGURE 18;

FIGURE 21 is a cross section through the valve body taken through the central port therein substantially along line 21—21 in FIGURE 18;

FIGURE 22 is a fragmentary central sectional view through the valving unit having a sequence bonnet mounted on one end of the valve member in place of the usual bonnet;

FIGURE 23 is a broken end elevational view of the structure shown in FIGURE 22;

FIGURE 24 is a side elevational view with parts of the valve broken away showing a hand operator for the valve in place on the body in place of the usual bonnet;

FIGURE 25 is a top plan view of the hand operator shown in FIGURE 24;

FIGURE 26 is a broken fragmentary sectional view through the pivot member of the hand operator taken substantially along line 26—26 in FIGURE 25;

FIGURE 27 is an end elevational view of the pivot member shown in FIGURE 26 removed from the assembly.

Figure 1:
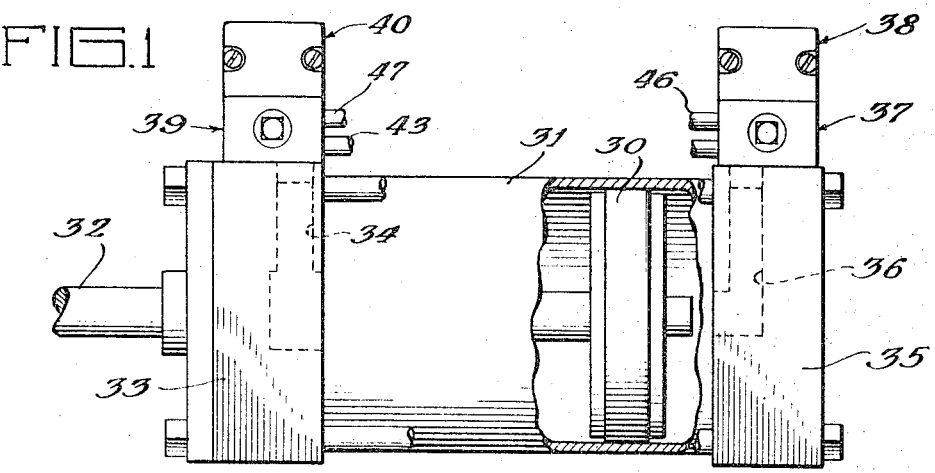
FIGURE 1 is a broken side elevational view partially in section of a piston and cylinder device with a pair of valve units of this invention mounted thereon.
Figure 2:
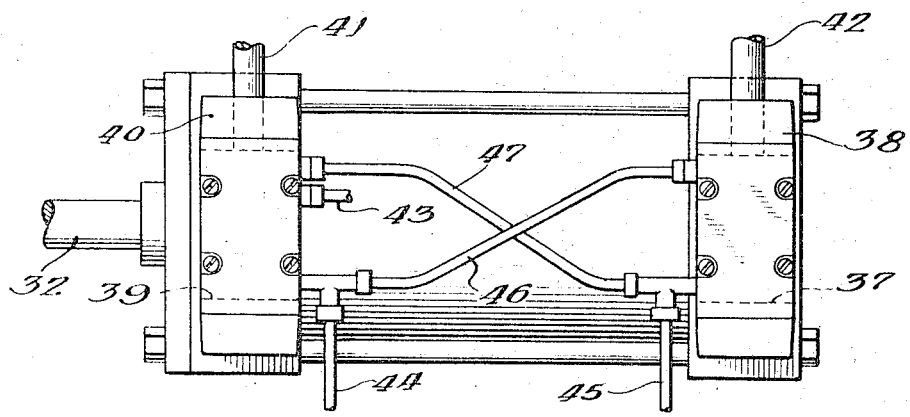
FIGURE 2 is a top plan view of the structure shown in FIGURE 1.

Referring particularly to FIGURES 1 and 2 of the drawings, there is shown a piston and cylinder device having a piston 30 reciprocable within a cylinder barrel 31 in order to move a piston rod 32 in and out through a head 33. Piston and cylinder devices operated by air or hydraulic pressures are widely used for many operations, the present device being illustrated in a machine tool grade air cylinder. The head 33 has a port 34 through which air is conducted to the left-hand side of the piston 30. The cap 35 on the opposite end of the cylinder has a similar port 36 for conducting air to and from the cylinder on the right-hand side of the piston. The head and cap are of square design having flat surfaces with ports containing a threaded outer portion where the passages intersect the outer surface of the head or cap.

In the present invention the cylinder movement is controlled by a valve mounted as close as can be to the port in the head of the cylinder. In FIGURES 1 and 2 the valving unit so mounted comprises a subplate 37 and a valve 38 mounted directly thereon, the entire assembly being on the cap 35 of the cylinder. On the head of the cylinder at the left-hand end there is an identical subplate 39 and an identical valve 40. As best illustrated in FIGURE 2, air is conducted to the left-hand valve unit through a pipe 41 and to the right-hand unit through a pipe 42. These supply pipes may be conveniently provided with pipe threads and directly threaded into the respective subplates 37 and 39.

In FIGURE 2 certain air control tubing for the valves is illustrated. A control tubing 43 supplies air to a remote valve which controls the conduct of air to pilot air passages within the valves 38 and 40 for air actuation of the valve spools in valves 38 and 40. The line 44 is connected to the valves in such a fashion as to cause the valves 38 and 40 to be set to cause the piston rod 32 to retract into the cylinder and the line 45 produces the opposite effect. In this instance, the valves 38 and 40 would each be a two-position momentary impulse valve, that is, the spool in the valve would remain in the position to which it was forced by the pilot air pressure until such time as pilot pressure was introduced into the opposite end of the spool to move it to its other position. Since one set of pilots is cross connected by a control line tubing 46, a single control line 44 may conduct the control air to the opposite ends of the valves 38 and 40, effecting movement of the spools therein simultaneously and similarly the cross connected tubing 47 between the opposite ends of the valves moves the spools of the valves in the opposite direction.

Ordinarily, valves used to control the air motive fluid are termed power valves when used in a power line, and the valves which control the power valves are generally termed control valves when used in control lines. Valves 38 and 40 are power valves as used and as illustrated, since they control the air used as motive fluid for the piston and cylinder device when mounted as shown in FIGURES 1 and 2.

Figure 3:
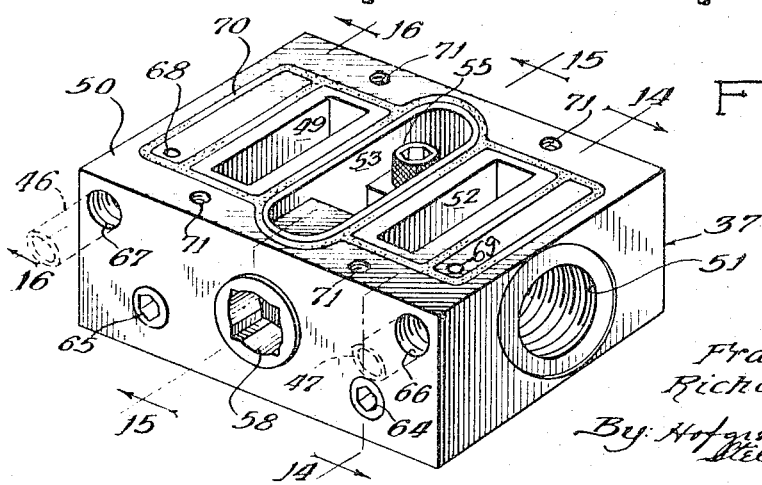
FIGURE 3 is a perspective view of the subplate unit of the valving structure of this invention showing the top surface upon which the valve member is to be mounted.

The valving structure is an assembly of two primary parts as illustrated in FIGURES 4 to 8. The subplate 37 is a rectangular box-like aluminum die-casting with certain machined surfaces and passages. As illustrated in FIGURE 4, the air inlet pipe 42 may be directly threaded into a pipe threaded port 48 in one end of the subplate so as to connect with the subplate passage 49 exiting the plate on the top flat machined surface (FIGURE 3). The spool valve 38 fastens directly onto the flat surface 50 of the subplate, its ports and air passages mating with those in the subplate.

The subplate structure is best illustrated in FIGURE 3 and the sections therethrough of FIGURES 14 to 16. A threaded opening 51 is on the end opposite the opening 48 so that an air supply pipe may be threaded into either end of the subplate. Tapped passage 51 communicates with the upright passage 52 equally distant from the center of the subplate as is the passage 49. In the central part of the subplate there is a passage vertically through the subplate designated 53. In FIGURE 15 it may be noted that intermediate the passage, there is a partial wall 54 providing a support for a machine screw 55 to be connected to the port nut 56 by which the entire subplate 37 might be attached to the threaded port of a piston and cylinder device such as the port 36 in the cap 35 (FIGURES 1 and 4). Air may be conducted through the central passage 53 through the port nut 56 on into the cylinder.

The central passage in the subplate is also provided with a lateral threaded opening 57 shown in this instance as being blocked by a plug 58, its purpose being the connection of the cylinder port air passage of one subplate to another. This connection may be needed when it is desired to operate two piston and cylinder devices simultaneously, in which case one valve could control motive fluid flow to two devices. Such port may also be used in sequence operation where the passage 57 is connected to the pilot control of another cylinder. When air is flowing into the piston and cylinder device generally little pressure build-up occurs until near the end of the stroke, at which time the pressure build-up could actuate a second device providing operation of the devices in sequence.

The physical act of connecting the subplate to the piston and cylinder head or cap is also used to seal the subplate to the cylinder head by means of an O-ring held captive in a groove 59 around the circular cylindrical passage 60 out of the central passage 53 in the bottom surface of the subplate. When the plate is pulled down tight on the cylinder head, the O-ring 61 (FIGURE 4) effectively seals between the subplate and cap. The area about the passage 60 may be slightly raised from the bottom flat surface of the subplate to insure proper O-ring sealing function as illustrated.

The subplate has its end passages 49 and 52 symmetrical about the center line so that either one can be the supply port and other can act as the exhaust. Referring to FIGURE 4, when the air line is threaded into one of the ports, an exhaust muffler 62, a porous bronze member capable of controlling the speed of the device by metering the exhaust air, is threaded into the other port.

Each of the end ports in the subplate is provided with a threaded port and air supply may be taken from the one at the supply end of the subplate for operating control valves or other devices. Also air may be taken from the threaded port of the exhaust end of the subplate for operating other devices. Referring to FIGURES 7 and 14, a threaded passage 63 is tapped from one side of the subplate 37 normal thereto in position to intersect the passage 52 in one corner of the passage. When not in use, a socketed threaded plug 64 may be inserted in the passage (FIGURE 3). At other times a tubing may be connected with the passage in order to obtain air from either the air or the exhaust ports in the subplate. Referring to FIGURE 3, the similar threaded passage in passage 49 is shown provided with a plug 65. Sequence operations may be controlled with air from the exhaust side as well as the supply side of the subplate 37.

The subplate is also provided with passages for conducting pilot air pressure to a valve such as 38 mounted on the subplate. The passages for conducting the pilot air are shown in FIGURES 3, 7 and 16. At each end of the subplate there is a threaded passage 66 or 67 perpendicular to the side of the subplate and to which an upright drilled hole 68 or 69, respectively, is connected. Thus, tubing such as 46 connected to the pilot connection of the subplate may conduct air to the flat upper surface 50 for the purpose of providing pilot actuation of the valve 38 mounted on the subplate.

The physical act of mounting the valve 38 on the subplate 37 also seals the valve to the subplate. Extending around each of the passages in a continuous fashion and mounted in a groove in the flat upper surface of the subplate is a resilient gasket 70. When the valve is mounted on the subplate, the resilient gasket seals the valve and subplate together. Four tapped bores 71 extend into the subplate block at right angles to the flat upper surface 50 for the purpose of receiving screw fasteners 72 extending vertically through the valve housing to attach the valve to the subplate. The screws and their threaded bores are symmetrical about longitudinal and lateral center lines permitting the valve to be mounted end-for-end in either of two positions 180° apart permitting the inlet air line to be piped to either end of the subplate. The ports are arranged for mating in either position of the valve relative to the subplate.

The power valve of this invention comprises a minimum number of parts. The body 73 (FIGURE 17) is an aluminum die-casting having a longitudinal bore 74 for the reception of a valve spool 75. The valving body has a flat lower surface 76 intended to rest against the gasket 70 on the flat upper surface 50 of the subplate. The longitudinal bore of the valve body is intersected by three ports of air passages, each formed as illustrated in FIGURE 21. The central air passage 77 extends from the flat surface 76 upwardly substantially perpendicular to the longitudinal bore 74. It is larger than the bore 74 in order to provide a passage all around the bore. While the central passage 77 is slightly off-center, it may be noted that the central passage in the subplate 37 is wider than the passage in the valve body so that the two passages will mate when the valve is turned end-for-end on the subplate. The valve body is provided with an inlet air passage 78 and exhaust passage 79 equidistant from the center of the valve body. In the cross section through the exhaust passage (FIGURE 19) two of the bores for receiving the mounting screws 72 are illustrated, each with a central threaded section 80 whereby the screws 72 may be held captive in the valve body by first threading through the section 80, whereupon the fastener is loose in the bores 81 so as to mate with the threaded bores 71 in the subplate.

The manner in which the pilot air pressure is conducted to the end of the valve body is best illustrated in FIGURES 17, 18 and 20. A groove 82 extends crosswise of the valve body and indented from the flat lower surface 76. At one end of the groove a bore 83 extends into the body toward the central bore 74. A small longitudinally extending passage 84 connects the bore 83 with the end of the valve body just outside of a projecting flange 85 integral with the end of the body. The provision of the groove 82 across the valve body permits the pilot air passages 68 or 69 in the subplate to always have communication with the end of the valve body. Nothing herein should be construed as limiting the actuation of the valve with air only as the pilot passages could be supplied with liquid under pressure from another source so that the valve would be hydraulically actuated.

Referring to FIGURE 4, the valve spool 75 carries an O-ring seal 86 at one end and a similar O-ring 87 at the opposite end for sealing the ends of the spool to the bore of the body. Pilot air pressure conducted to the end of the valve body can thus act on the end of the spool and be sealed from the balance of the valve by the O-rings 86 and 87.

As illustrated in FIGURE 4, the inlet air comes into the left-hand side of the valve and is prevented from going past the reduced section 88 on the spool by the O-ring 89 cooperating with the bore 74 acting as a land. As illustrated in FIGURE 4, the valve 38 is arranged as a momentary impulse valve. The spool will stay in either extreme to which it has been moved.

Each end of the valve has three parts, a bonnet 90, a valve spring 91 and a valve spring cage 92. The bonnet is rectangular as shown in FIGURE 6, held in place by a pair of screw fasteners 93 threaded through the valve bonnet and into the valve body. On the inside, the bonnet has a circular cylindrical recess and a central round post 94. The post cooperates with the round extension 95 on the end of the spool providing a stop, limiting movement of the spool in the body.

The valve spring cage and the spring may be mounted in different positions between the spool and the bonnet depending upon the desired operation of the valve. The cage has a cylindrical part which is of a size to extend into the bore 74 in the valve body quite easily and an outer flange 96 at one end of the cylindrical part too large to fit into the bore 74 but readily movable in the larger bore in the bonnet. As shown in FIGURE 4, the valve spring is held captive between the flange 96 on the cage and the end wall of the bonnet so that it is inoperative. The spring itself is a coiled compression spring with one end small enough to fit within the bore 74 of the valve body and the other end being larger to fit about the cylindrical part of the cage and against the enlarged flange 96. One of the features of the present invention is that the cage and spring are present in the valve package and thus available for making the valve into different operative arrangements. The bonnets may be easily removed and attached to the valve body being sealed thereto by a rectangular O-ring 97 operative upon the fact of attachment of the bonnet to the valve body. The bore in the bonnet is sufficiently large not to interfere with the passage of pilot air pressure through the pilot passages into the bonnet.

The different arrangements of the cage and spring to the ends of the valve spool to obtain different modes of operation of the valve are illustrated in FIGURES 9 to 12. In each of the figures, the air inlet is the left-hand port, the central port is connected to the piston and cylinder device and the right-hand port is the exhaust port, all as indicated by the arrows adjacent the passages.

Figure 9:
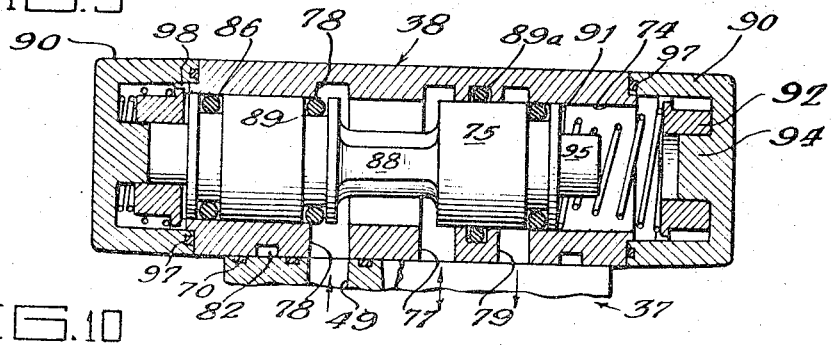
FIGURE 9 is a broken cross sectional view through the valve member showing the arrangement of parts arranged for a normally open valve operation.

FIGURE 9 shows a normally open valve. In this instance the cage 92 on the right-hand side is mounted with its cylindrical part against the bottom wall of the bonnet 90 so that the cage surrounds the upstanding post 94 in the bonnet. The small end of the spring 91 is caused to enter the bore of the valve body so as to bear against the valve spool 75. The larger end of the spring bears outwardly against the end of the cage. The spring thus actively urges the valve spool to the left and into the position illustrated wherein the air supply is connected to the cylinder.

The left-hand end of the normally open valve shown in FIGURE 9 has its cage holding the spring compressed between the flange on the cage and the end wall on the bonnet in an inoperative position. The cage flange engages the raised end 85 of the valve body limiting its travel toward the valve body. The valve will be closed by pilot air pressure conducted into the left-hand end of the valve of sufficient magnitude to overcome the compression in the spring 91 on the right-hand end, thus forcing the spool to the right. The spool travel is arrested by engagement of the projection 95 on the spool with the post 94 in the bonnet 90.

Figure 10:
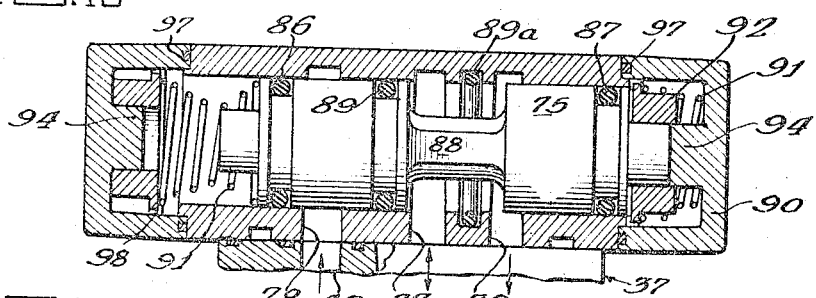
FIGURE 10 is similar to FIGURE 9 showing the arrangement of parts for a normally closed valve operation.

FIGURE 10 shows the position of the cages and springs to provide a normally closed valve. Thus, the right-hand cage 92 holds the spring 91 between its flange and the end wall of the bonnet 90. The left-hand cage is mounted about the central post 94 of the bonnet and holds the spring actively compressed between the cage and the end of the valve spool, thus urging the spool to its right-hand position with the right-hand projection against the post in the right-hand bonnet. Quite obviously, this position of the valve spool connects the exhaust passage with the central passage 77 in the center of the valve while the O-ring 89 cooperating with the bore 74 of the valve closes communication between the supply and cylinder.

Figure 11:
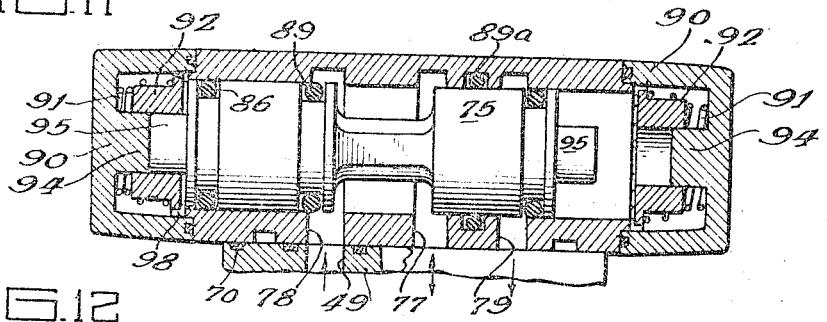
FIGURE 11 is similar to FIGURE 9 showing the arrangement of parts for a momentary impulse valve operation.

FIGURE 11 shows the condition and arrangement of the spools and springs providing the valve with a momentary impulse operation. It is a two-position valve in which the valve spool 75 is moved to its extreme position to the left or to its extreme position to the right by the impulse of pilot air pressure acting on the end of the spool. Once the spool is moved, it will remain in its extreme position until acted upon by pilot air pressure, thus moving the spool in the opposite direction.

For momentary impulse operation each cage 92 holds the spring 91 between its flange and the end wall of the bonnet 90. Thus, each spring is in effect inactive so that the valve spool travels between extreme positions with its end projections 95 abutting one or the other of the posts 94 of the bonnets.

Figure 12:
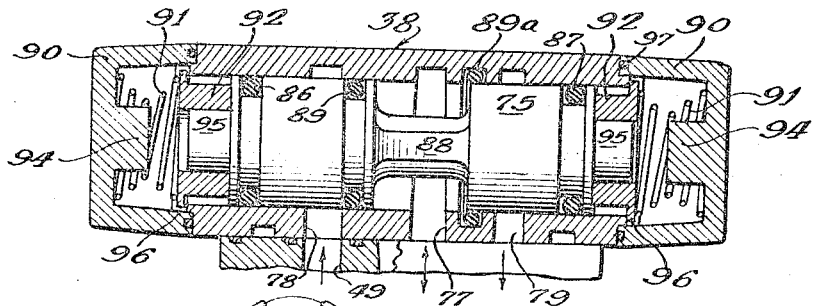
FIGURE 12 is similar to FIGURE 9 showing the arrangement of parts for a three-position spring-centered valve operation.

In FIGURE 12, a three-position spring-centered valve operation is accomplished by the arrangement of valve cages and springs. Each end of the valve is the same so that the springs with the cages abutting against stops and the spool abutting the cages centers the valve spool closing all ports. In this instance, the cage 92 is turned end-for-end from its position described above, so that its cylindrical part extends into the valve bore 74, the extent being limited by the flange 96 on the cage engaging the end 85 of the valve body. The spring 91 is compressed between the end wall of the bonnet 90 and the cage. As the valve spool 75 moves against the compression of the spring 91, the cage can move inside the bonnet to allow the movement of the spool 75. The cage may actually telescope to a slight extent over the post 94 during such operation. The valve spool is ordinarily moved by pilot air pressure conducted to one bonnet or the other, the air pressure being sufficient to overcome the spring compression. Once the air pressure is released, the described arrangement of springs and cages positively will return the valve spool to its center position blocking all ports.

The present valve structure 38 thus contains within its package all of the structure by which the valve can alternatively be made to function as a two-position normally open valve, a normally closed valve, a momentary impulse valve, or a three-position, spring-centered valve. The change from one mode of operation to another may be very simply accomplished since either bonnet 90 may be easily removed, the arrangement of the cage and spring selected and the bonnet reattached to the valve body.

Figure 13:
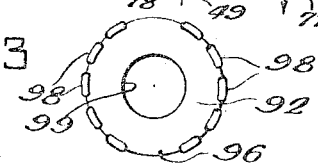
FIGURE 13 is an end elevational view of a valve spring cage utilized in the valve structure shown in FIGURES 4 to 12.

The valve cage is also preferably an aluminum die-casting in which the flange 96 is provided with spaced enlarged nodules 98 which extend beyond the end of the flange longitudinally of the central bore 99 and also extend laterally outwardly so that while the cage is mounted within the valve, there is always space between the nodules through which air for pilot operation of the valve may be conducted (FIGURE 13).

The operation of the valve unit, while equipped with the components arrangeable for the various open, closed, momentary impulse and spring-centered operations specified, is also readily convertible to other operations. In a sequence operation where two piston and cylinder devices, for example, are to operate one after the other, the valve may be modified to provide such operation automatically. In this instance, the valve on the first cylinder might be a momentary impulse air-actuated valve and a connection into the central port of the subplate 37 through the removal of plug 58 would be made to the pilot connection of the subplate on an adjacent cylinder. Air pressure in the first cylinder subplate would build up in amount when the first cylinder reached the end of its stroke. This increase of pressure would also be conducted through the connected line to the pilot operator of the second cylinder's power valve.

In order to make the second valve described above work in the sequence operation, the valve spool of the valve would be kept in either a normally open or a normally closed position by an adjustable spring which is intended to be overcome by the air pressure from the central port of the first cylinder power valve subplate. Thus, the bonnet on the left-hand end of the valve such as illustrated in FIGURE 10 or the bonnet on the right-hand end of FIGURE 9 is replaced by a bonnet containing an adjustable spring against which the air pressure will operate through the intermediary of the valve spool. Referring to FIGURES 22 and 23, it may be noted the valve 38 is mounted on the same subplate 37 having the air supply pipe 42 threaded into the supply port 48 communicating with the air supply passage 78 in the valve body through the supply passage 49 in the subplate. The left-hand ordinary bonnet, cage and spring has been removed and replaced by a sequence bonnet 100. This is an elongated bonnet containing a spring 101 extending between a spacer 102 surrounding the extension 95 on the end of the valve spool and providing a pad against which the spring rests, and a spring seat washer 103 at the opposite end of the spring. The bonnet 100 is closed, drilled and tapped at its end 104 so as to receive a threaded shaft 105 movable lengthwise into and out of the bonnet by a turning handle 106. A check nut 107 may be threaded on the shaft and placed in position to limit the amount of movement of the shaft into the bonnet if desired. The base portion 108 of the bonnet is rectangular and of the same size as the regular bonnet 90 on the valve and held in place on the valve body by a pair of screw fasteners 109 (FIGURE 23). The shaft 105 bears against the spring seat 103, but is not connected thereto, so that turning of the shaft can adjust the spring seat toward and away from the valve spool, changing the force applied by the spring 101 against the valve spool to hold it in the normally closed position. This adjustment can vary the magnitude of air pressure which has to be exerted against the right-hand end of the valve 38 to overcome the spring pressure and thus open the valve for sequence operation of piston and cylinder devices. By maintaining the pilot pressure on the right-hand end of the valve 38, the valve may be held open as long as desired. The sequencing operation can cause the movement of the piston rods of the controlled cylinders in one direction in sequence and then in the opposite direction in sequence or together or in other sequences as desired.

Manual control of the valves is also desirable in certain circumstances. A foot treadle, palm buttons, or hand levers are various manual means for operating valves. The present valve structure is particularly adaptable to any of these operations. In FIGURES 24 to 27, a hand lever operator for the valve 38 is illustrated. Ordinarily, the hand lever replaces the right-hand bonnet on the valve as illustrated in FIGURE 4.

The hand lever (FIGURE 24) has a base portion 110 held in place upon the valve body by a pair of machine screws 111 oriented in position as are the screws 109 on the sequence bonnet or the screws 93 on the regular bonnet 90. A pair of arms 112 extend upwardly and away from the base 110 in order to support a shaft 113 upon which the hand lever 114 is mounted. Referring to FIGURES 26 and 27, the base of the hand lever comprises a pivot member 115 secured to the cross shaft by a set screw 116 and threadably supporting the lever 114 locked thereto by the nut 117. Below the shaft 113, the pivot member is bifurcated to provide four fingers operating in pairs. The operating pairs are the fingers 118 which have opposite straight line portions forming a throat between the straight lines 119. The pairs of so formed fingers 118 are separated as indicated in FIGURE 27 by the pairs 118 and 118a. The operation is for the purpose of straddling a shaft 120 which passes through the base 110 of the lever operator and is threaded into the extension 95 on the valve spool which is drilled and tapped for that purpose. The particular extension referred to is that shown on the right-hand end of the valve as illustrated in FIGURE 4. A collar 121 is secured to the shaft 120 and the fingers 118 embrace the collar 121 so that the line contact of the fingers therewith can move the shaft 120 longitudinally of the valve without binding. Any knob 122 can be provided on the handle as desired.

The handle operator may move the valve spool in opposition to spring pressure exerted against the valve spool to provide a normally closed valve as shown in FIGURE 10. It may also be used so that air pressure in the pilot port causes the valve to be normally closed. Since the handle is connected to the valve spool, it can be used to close, open, or hold the valve spool in a centered position where all ports are closed.

Figure 28:
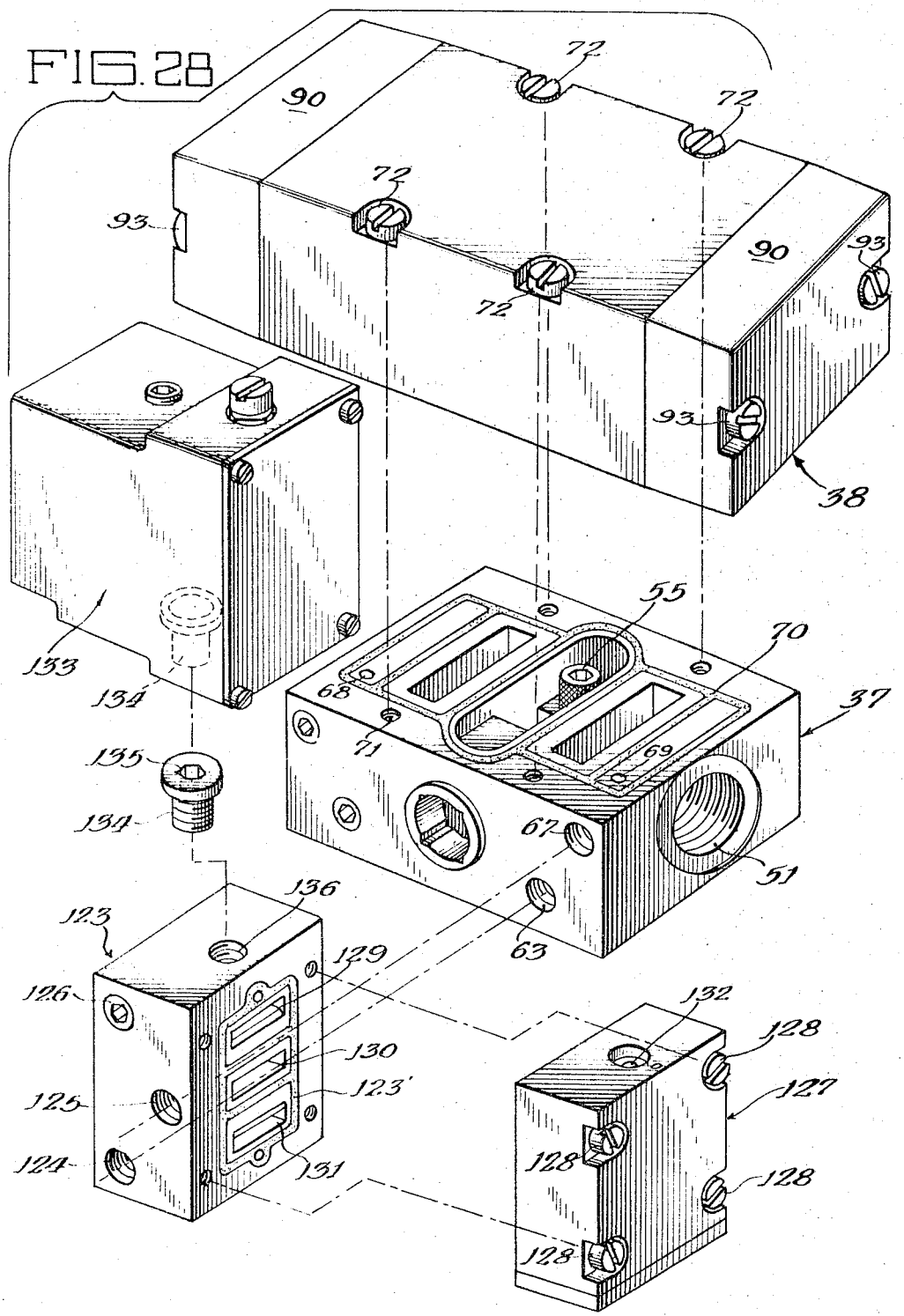
FIGURE 28 is an exploded perspective view of the valve assembly illustrated in FIGURE 4 with a control valve, control valve subplate, and solenoid assembly comprising a part of the invention.

The present valving unit is admirably suited for remote control or the mounting of controls directly to the subplate part of the unit. In FIGURE 28 an exploded view of the components showing the modules of a control mounted directly to the valving unit consisting of the subplate 37 and valve 38 is illustrated. In this instance, air is supplied to the port 51 on the right-hand side of the subplate 37. Control air is tapped from the supply and therefore, the plug 64 would be removed from the tapped passage 63 since this passage will be connected with the air supply. A three-port subplate 123 with an eighth inch tapped through passage 124 to match the eighth inch tapped passage 63 on the subplate 37 may be attached directly to the subplate by a fastener utilizing the threads in both passages. At the same time the threaded passage 67 in subplate 37 connects with the pilot air pressure opening 69 which passages can be used to control the valve 38 as has been described. A tapped passage 125 in the three-port subplate 123 is so arranged that its relationship to the tapped passage 124 matches the relationship between the two tapped passages in the subplate 37. Thus, fasteners each utilizing the threads in the passages 124 and 67, respectively, can be used to further secure the small valve subplate to the side of the larger valve subplate 37, it being understood that appropriate gaskets are provided between the two blocks of the subplates. Once the connection is made, plugs such as 126 may be inserted in the exposed passages 124 and 125 blocking escape of air from the subplate 123.

The control valve is a two-position, open or closed, spool-type valve 127. It is mountable by four screws 128 directly into the subplate 123 so that the valve ports communicate with the ports 129, 130 and 131, there being a gasket 123' surrounding the ports in the same general fashion as the gasket 70 on the larger subplate 37. The end of the valve spool 132 is visible in the drawings on the upper end of the valve 127.

The solenoid operator which performs merely the function of moving the valve spool in the control valve 127 may, in the present modular system, be attached to the small valve subplate 123. Herein, the solenoid housing 133 is shown as having the same width as the subplate 123 and the valve 127. A headed screw fastener 134 with a hex opening 135 therein may be extended through an opening in the bottom wall of the solenoid housing and threaded into a tapped end passage 136 in the small valve subplate to secure the solenoid housing to the subplate. When so secured, the solenoid plunger will be directly in line with the valve spool of the small valve 127.

It is the purpose of the present valving unit consisting of its subplate 37 and valve 38 to so form the subplate that components such as control valves and solenoid operators therefor may be either directly attached to the subplate 37 or remotely assembled thereto. FIGURE 28 illustrates the convenience with which such components may be secured to the subplate 37 because of the arrangement of the tapped ports through which control air may be taken from the source piped to the subplate and the relationship thereof to the pilot ports such as 67 making it convenient to provide control air pressure to the ends of the valve spool of valve 38. Since the subplate 37 is fastened to a piston and cylinder device by a fastener 55 completely inside the air passages, the gaskets on the faces of the subplate are all that are needed for sealing purposes in the assembly. Similarly, it is contemplated that gaskets between subplates directly mounted are provided in connection with the fasteners used so no other sealing structure is needed. It may be noted that in the arrangement shown in FIGURE 28, the valve 38 can be removed from the subplate 37 completely independently of any of the other structure. Additionally, the piston and cylinder device could be removed from the valving unit without disturbing the control valves, the solenoid or removing the same from the subplate 37. Likewise, either the control valve 127 or the solenoid box 133 could be removed since they are only connected to the subplate 123 and such removal would not disturb any of the other modules.

It may be seen from the foregoing that the present valving unit provides a novel modular construction whereby the components may be secured together to get whatever valve operation is desired. By directly attaching a subplate to each port of a piston and cylinder device and piping the air supply to that subplate, many advantages accrue. Pressure regulators may be set independently of each other to provide whatever pressure is desired on each end of the cylinder. High pressure may be desired for the working stroke and relatively low pressure for the return stroke, thus saving considerable expense in compressing air.

The direct mounting of the valving unit on the ports of a piston and cylinder device provides the greatest speed of operation as well as providing the greatest flexibility in the type of operation desired. The valving unit has great flexibility in providing various operations and carrying the components therein for supplying these operations. However, it is contemplated that the greatest benefits can be achieved by using the valve as a momentary impulse air-actuated valve structure. The controls for air actuation can be all air and merely started and stopped electrically at a remote location or any hand, foot, treadle or other manually operated remotely placed control valve. This gives all the advantages of greater speed and air savings and piping savings by mounting the power valve close to the motor and making variations only in the manner of control. The necessity for various sizes of power valves and different modes of operation thereof may be eliminated.

The use of momentary impulse valves 38 and 40 also simplifies the problem of piping. After connections are made in a particular installation, the controls may be actuated and the cylinder operation observed. Should the piston rod move in the wrong direction in relation to the throw of the control valves, the control leads may be simply reversed either at the subplates 37 and 39 or at the control valves. Complicated piping diagrams may be largely eliminated by the use of the present valving structure.

The foregoing detailed description has been given for clearness of understanding only and no unnecessary limitations should be understood therefrom as some modifications will be obvious to those skilled in the art.

We claim:

1. A valving unit, comprising:
 a generally box-like subplate having a substantially flat upper surface with ports within the confines of said surface,
 a spool-type valve having a flat bottom surface with ports within the confines of said bottom surface,
 a plurality of fasteners having mating parts in said valve and subplate engageable for removably securing said valve to said subplate with said ports in register,
 said subplate having a central passage from one of its ports extending through the subplate for conducting fluid to and from the valve to a member supplied with fluid through the valving unit,
 said subplate having a web extending across a portion of said central passage and a fastener secured against said web and to said member supplied with fluid through the valving unit for securing the subplate to such member,
 said fastener being wholly within the passage for fluid through the subplate and into such member requiring no seals about the fastener,
 means forming separate passages on either side and adjacent of said central passage in the subplate from its other ports, each having a lateral passage to the exterior of the subplate for connection of fluid supply and exhaust whereby fluid may be supplied to the subplate independently of the valve and flow thereof to the central passage is controlled solely by the valve secured to the subplate.

2. A valve as specified in claim 1 in which a fluidtight closure is mounted on one end of the valve body, a passage extends in the valve body from said flat bottom surface to said one end for introduction of fluid into the closure providing pressure against the valve spool, and an elongated bonnet is removably secured to the other end of said valve body, said bonnet having an adjustable compression spring therein urging said valve spool in opposition to said fluid pressure at said one end of the spool.

3. A valving unit as set forth in claim 1 in which the subplate is provided with an auxiliary lateral opening connected into said central passage whereby operation of a plurality of devices may occur by fluid piping connections to said central passage controlled solely by said valve.

4. A valving unit as set forth in claim 1 in which said subplate flat upper surface has a groove extending continuously about the periphery of such surface and portions between each adjacent port with all portions of said grooves joining the same in continuous fashion and a resilient gasket of continuous form substantially filling said groove separating said ports and providing a seal between the flat surface of the subplate and the flat bottom surface of said valve upon the securing of said fasteners to hold the valve on the subplate, 5. A valving unit member, comprising:
 a subplate having substantially flat surfaces arranged in box-like fashion with outer surfaces including an upper, a lower, two end and two side surfaces,
 the upper flat surface having ports within its confines for mounting a spool-type valve upon said flat surface with ports mating the ports in said flat surface,
 means forming a central fluid passage through the subplate between the upper flat surface and the opposite lower surface,
 means forming a separate passage extending from said flat upper surface into the subplate one on either side of said central fluid passage,
 means forming a threaded opening from the adjacent end surface into the respective separate passage for connection of said passages to fluid supply and exhaust means,
 one side surface having a port therein in alignment with a portion of one said separate passage and means forming a threaded bore from said port inwardly from said side surface to intersection with said separate passage whereby fluid supply in said separate passage may be conducted to the side surface of the subplate,
 a pilot fluid port in said upper flat surface and means forming a passage from said pilot port to said one side surface so that a control valve unit may be connected to said subplate without disturbing either a valve mounted on said flat upper surface of said subplate or fluid conducting means connected to the subplate.

6. A valving unit member, comprising:
 a subplate for mounting a spool-type valve,
 means forming a threaded opening and supply passage in one end of the subplate,
 auxiliary lateral extending means in the subplate for tapping off fluid from the supply passage to the exterior of the subplate for pilot operation of said valve,
 means forming passages in the subplate for conducting fluid respectively to a connected device and to exhaust with such means being completely separate from the supply passage and each other within the subplate, said supply being connectable to such passages only through a valve mounted on the subplate,
 and means forming a pilot fluid passage in said subplate adjacent to said auxiliary fluid tapping means opening laterally to the exterior of the subplate whereby a pilot control valve may be connected to said subplate separate from a spool-type valve mounted on said subplate and control such spool-type valve through passages in the subplate.

7. A valving unit, comprising:
 a generally box-like subplate having a substantially flat upper surface with ports within the confines of said surface,
 a spool-type valve body having a flat bottom surface with separate ports within the confines of said bottom surface mating with said ports in said subplate,
 said ports in said valve including a central port and separate ports each longitudinally spaced equidistant from the center of the housing,
 a plurality of fasteners having mating parts in said valve and subplate engageable for removably securing said valve to said subplate with said ports in register, said separate ports being symmetrically arranged relative to said fastening means and said fastening means being symmetrical about the center of said valve body permitting the valve to be mounted relative to the subplate in either of two positions each 180° to the other position,
 said subplate having a central passage from one of its ports extending straight through the subplate for conducting fluid to and from the valve central port to a member supplied with fluid through the valving unit, means forming separate passages on either side and adjacent of said central passage in the subplate from its other ports, each having a lateral passage to the exterior of the subplate for connection of fluid supply and exhaust lines thereto whereby fluid may be supplied to the subplate independently of the valve and flow thereof to the central passage is controlled solely by the valve secured to the subplate, said subplate including a pilot fluid passage at each end adjacent said means forming separate passages, said pilot passages having a lateral portion opening to the side of said subplate for connection of a pilot fluid pressure line, said valve having a body provided with a pilot fluid passage internally of the body with connection to the end of the body and in registry with said pilot fluid pressure passage whereby pilot fluid may be conducted to the ends of the valve body for movement of the valve spool under influence of pilot fluid pressure.

8. A valving unit, comprising:

a generally box-like subplate having a substantially flat upper surface with ports within the confines of said surface, a spool-type valve body having a flat bottom surface with separate ports within the confines of said bottom surface mating with said ports in said subplate, said ports in said valve including a central port and separate ports each longitudinally spaced equidistant from the center of the housing, a plurality of fasteners having mating parts in said valve and subplate engageable for removably securing said valve to said subplate with said ports in register, said separate ports being symmetrically arranged relative to said fastening means and said fastening means being symmetrical about the center of said valve body permitting the valve to be mounted relative to the subplate in either of two positions each 180° to the other position, said subplate having a central passage from one of its ports extending straight through the subplate for conducting fluid to and from the valve central port to a member supplied with fluid through the valving unit, means forming separate passages on either side and adjacent of said central passage in the subplate from its other ports, each having a lateral passage to the exterior of the subplate for connection of fluid supply and exhaust lines thereto whereby fluid may be supplied to the subplate independently of the valve and flow thereof to the central passage is controlled solely by the valve secured to the subplate, said valve body having a pilot fluid groove extending across its flat bottom surface adjacent each end and a fluid passage internally of the valve body communicating the pilot fluid groove with the end of the valve body for directing pilot fluid to the ends of the valve body, said valve body having a hollow bonnet sealed to the end thereof with said fluid passage directing the pilot fluid to the interior of the bonnet for application of pressure to the valve spool.

References Cited by the Examiner

UNITED STATES PATENTS

| | | | |
|---|---|---|---|
| 2,709,421 | 5/1955 | Avery | 137—625.63 |
| 2,891,517 | 6/1959 | Towler et al. | 137—625.63 X |
| 2,928,380 | 3/1960 | Krapf | 137—625.63 X |
| 2,958,339 | 11/1960 | Meddock | 137—625.63 X |
| 2,961,001 | 11/1960 | Pippenger | 137—625.63 |
| 3,062,236 | 11/1962 | Ludwig | 137—625.69 |
| 3,089,517 | 5/1963 | Ludwig | 137—625.63 |
| 3,133,559 | 5/1964 | Tennis | 137—625.69 X |
| 3,135,294 | 6/1964 | Huber | 137—625.63 |
| 3,152,614 | 10/1964 | Carls | 137—625.69 |
| 3,174,510 | 3/1965 | Nelson | 137—625.69 |
| 3,182,729 | 5/1965 | Carlin et al. | 137—625.69 X |
| 3,191,626 | 6/1965 | Leibfritz | 137—625.69 |

FOREIGN PATENTS

| | | |
|---|---|---|
| 113,843 | 3/1918 | Great Britain. |

M. CARY NELSON, *Primary Examiner.*

S. SCOTT, *Assistant Examiner.*